United States Patent [19]

Bigelow, Jr.

[11] 3,896,517

[45] July 29, 1975

[54] CONNECTING APPARATUS

[76] Inventor: Floyd E. Bigelow, Jr., 6614 Lindyann, Houston, Tex. 77008

[22] Filed: Jan. 30, 1974

[21] Appl. No.: 437,777

[52] U.S. Cl. .................................. 14/71; 52/173 DS
[51] Int. Cl.² ................... E04H 14/00; B65G 11/00
[58] Field of Search ........... 52/126, 173 DS; 14/71; 135/5 A

[56] References Cited
UNITED STATES PATENTS

| | | | |
|---|---|---|---|
| 2,840,091 | 6/1958 | D'Azzo | 135/5 A |
| 3,500,599 | 3/1970 | Sciolino | 52/173 |
| 3,693,204 | 9/1972 | Eggert | 14/71 |
| 3,699,600 | 10/1972 | Gacs et al. | 14/71 |
| 3,772,839 | 11/1973 | Timbers | 135/5 A |

OTHER PUBLICATIONS

Leva Dock, Archictural Record, pg. 179, October 1948.

Primary Examiner—J. Karl Bell

[57] ABSTRACT

An improved connecting apparatus for providing a weatherproof connection between a stationary enclosure and a movable enclosure. The connecting apparatus is secured to the stationary enclosure. The movable enclosure is positioned in contact with the outer edges of the connecting apparatus whereby a connection corridor is formed between the stationary enclosure and the movable enclosure.

3 Claims, 8 Drawing Figures

PATENTED JUL 29 1975

3,896,517

SHEET 1

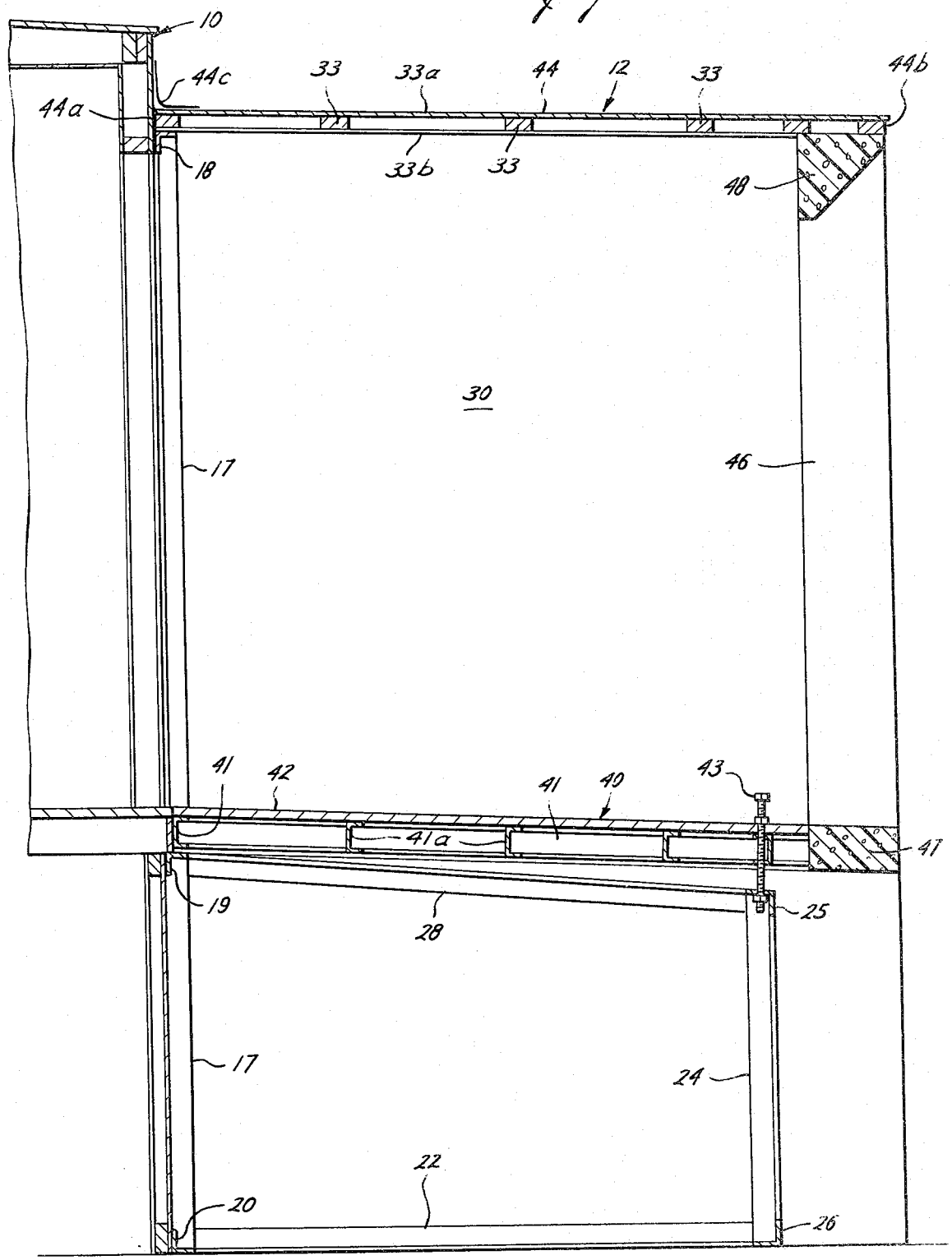

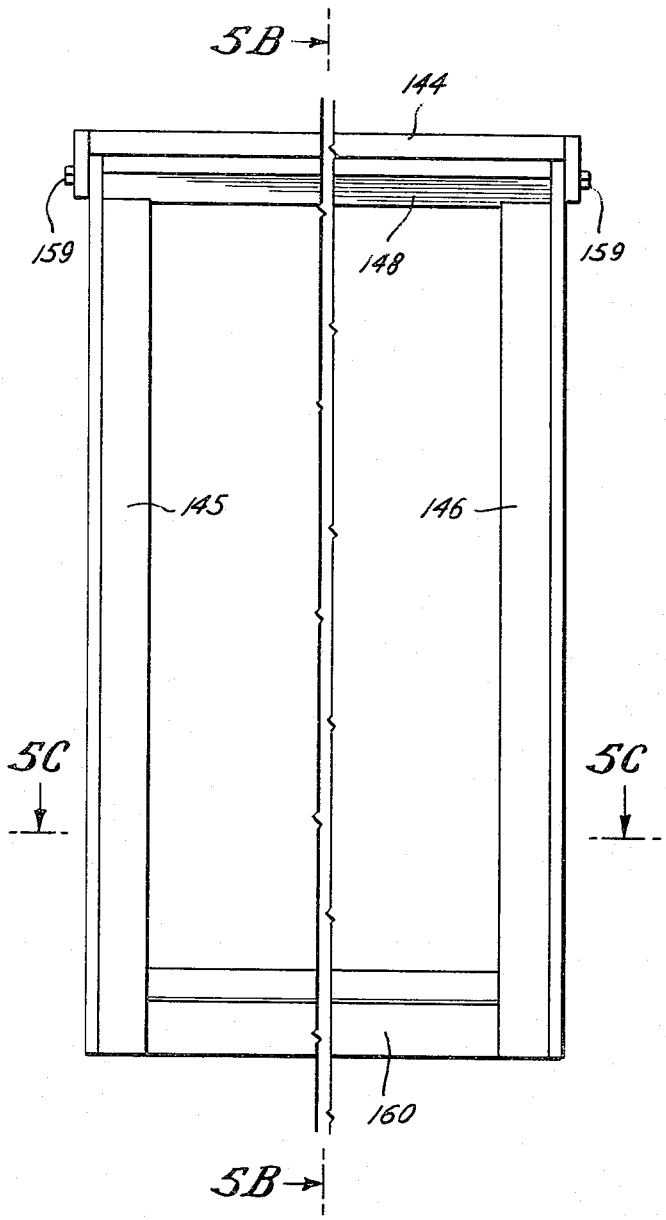
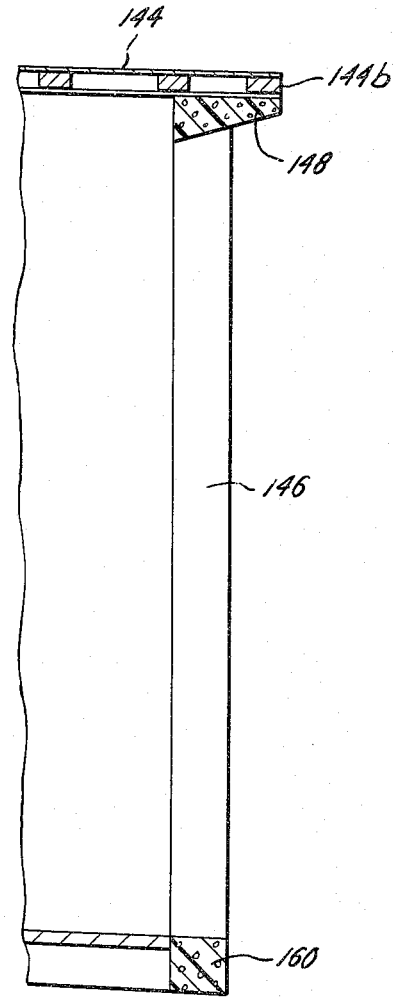
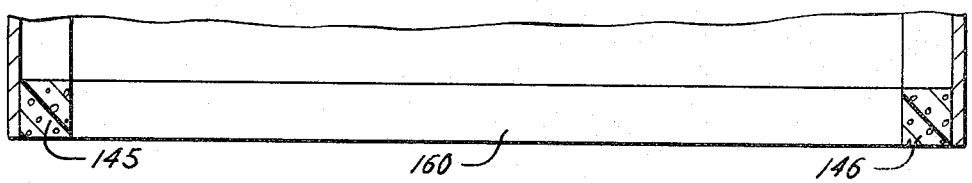

CONNECTING APPARATUS

BACKGROUND OF THE INVENTION

This invention relates to an improved connecting apparatus between a stationary enclosure and a movable enclosure.

There exists a need in inclement environments for a weatherproof connecting corridor between a stationary enclosure, such as a warehouse or the like, and a movable enclosure, such as a van, which is to be integrated therewith. The stationary enclosure may be a building of any type and includes portable buildings such as shown in U.S. Pat. No. 3,095,616. For example, often it is desirable to augment operations carried on by personnel in a stationary building through the use of temporary facilities provided by a movable van of various width and height. The van is positioned adjacent the building with the door of the van aligned with an opening to the building. It is desirable that a connecting corridor be employed between the door of the van and the opening of the building so that personnel may move freely between the building and the van, so that there can be electrical and other type communication between the building and the van.

It is an object of this invention, therefore, to provide an improved connecting corridor between a stationary enclosure and a movable enclosure of various width and height.

It is a further object of this invention to provide an improved connecting devise which may be utilized in inclement weather conditions to easily and quickly effect a weatherproof corridor between a stationary building and a movable van of various width and height positioned adjacent thereto.

This invention possesses many other advantages and has other objects which may be more clearly apparent from the consideration of the forms in which it may be embodied. Several embodiments of the invention are shown in the drawings accompanying and forming part of the present specification. These embodiments of the invention will now be described in detail for the purpose of illustrating the general principles of the invention, but it is to be understood that such a detailed description is not to be taken in a limiting sense.

BRIEF DESCRIPTION OF THE DRAWINGS

Referring to the drawings in which like numerals represent like parts:

FIG. 3 is an elevational view of the connecting corridor taken at line 3—3 in FIG. 1 with the van omitted.

FIG. 4b is a sectional view taken at line 4b—4b in FIG. 4a.

FIG. 5a is an end view of another embodiment of a connecting corridor according to this invention.

FIG. 5b is a sectional view taken at line 5b—5b in FIG. 5a.

FIG. 5c is a sectional view taken at line 5c—5c in FIG. 5c.

DESCRIPTION OF PREFERRED EMBODIMENTS

Figure 1:
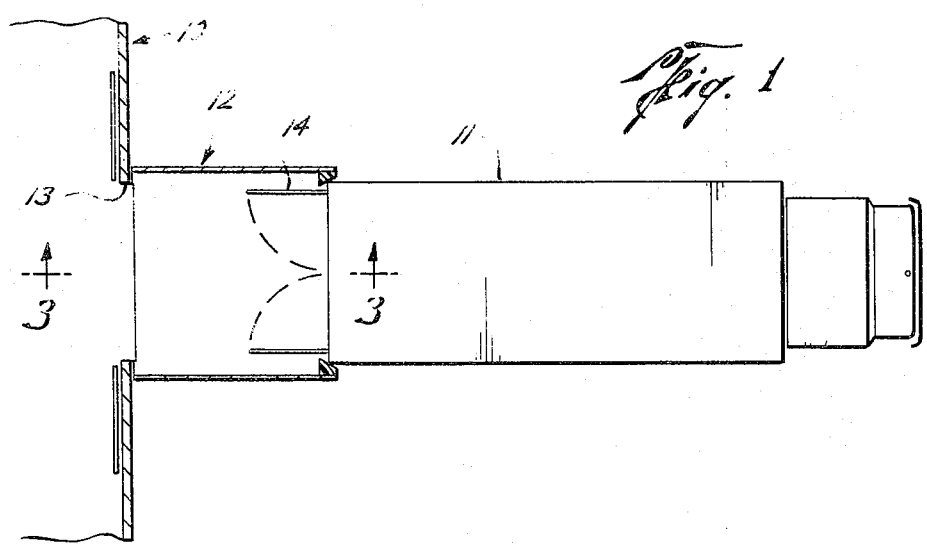
FIG. 1 is a plan view of a connecting device according to the invention forming a corridor between a building and a van.

FIG. 1 illustrates schematically in plan view a stationary enclosure 10, such as a building or the like, with which a movable vehicle 11, such as a van or the like, is to be integrated. For example, there may be personnel working within the building 10 and it may be desirable to provide such personnel with additional facilities. Such additional facilities may be located within van 11. It is desirable, particularly in inclement weather conditions, for there to be a weatherproof connection corridor 12 between the building 10 and the van 11. The connection corridor 12 preferably is sealed to the building 10 around an opening 13 or door in that building and is constructed such that the van 11 of various width and height can be moved into a sealed relationship therewith. When the van 11 is moved into a sealed relationship with the connection corridor 12, the opening or door 14 of the van preferably is positioned within the connecting corridor 12 so that the van becomes integrated with the stationary enclosure, that is, personnel may move freely between the building and the van, and there can be communication between the building and the van through the connecting corridor. FIG. 1 shows a van 11 having a door 14 in its end. However, the door 14 could be located in the side of the van 11 and, in such a case, the van would be backed into a modified connecting corridor 12 so that the side of the van seals against the corridor.

Figure 2:
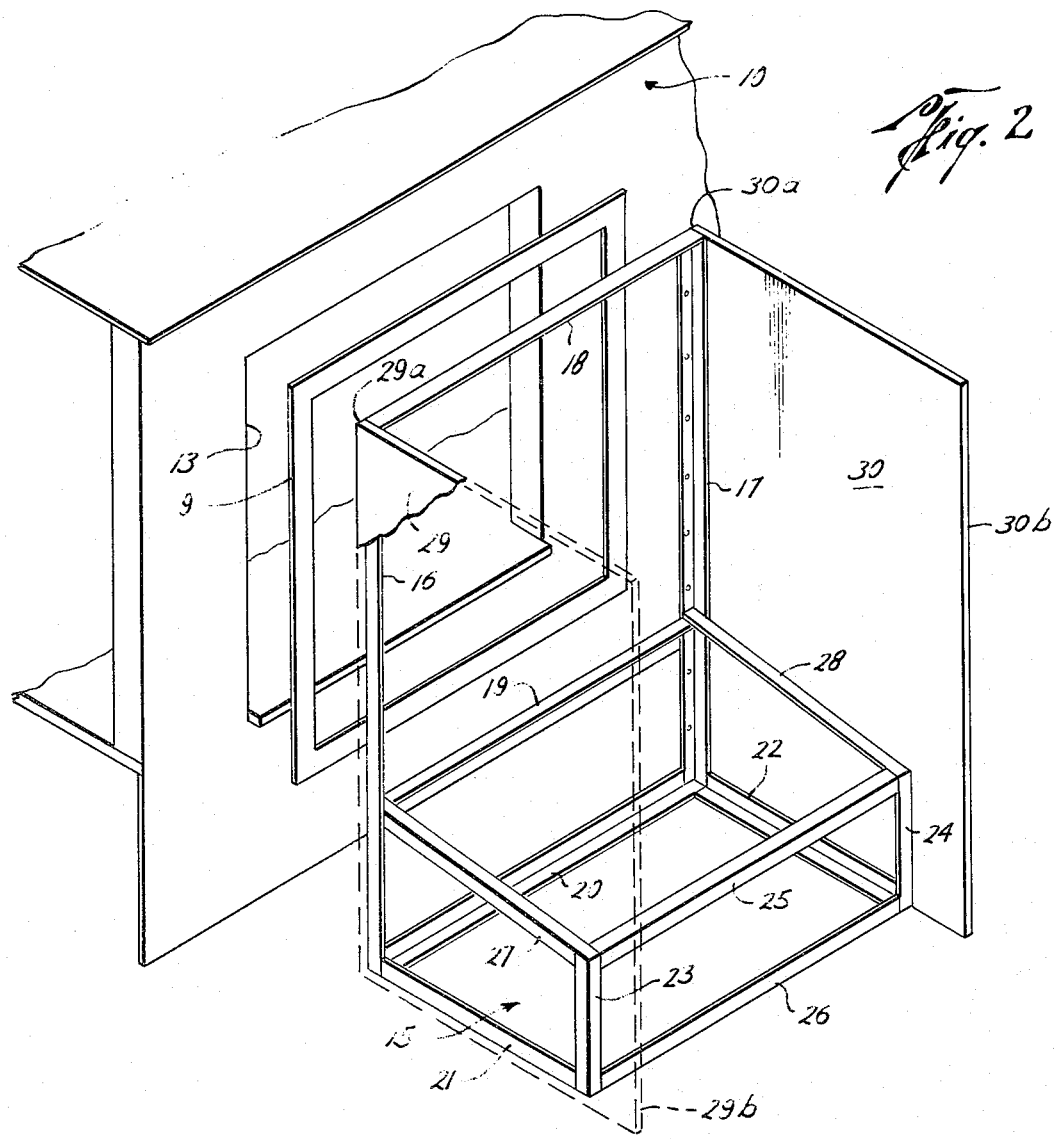
FIG. 2 is an exploded isometric view of a frame apparatus and fragment of a stationary building for a connecting corridor according to the invention.

It is preferred that the connection corridor 12 include a frame apparatus connected to the stationary enclosure 10. The frame apparatus preferably receives and supports two parallel side walls, a base platform, and a cover structure. FIG. 2 shows in isometric form a preferred frame apparatus 15. The frame apparatus 15 preferably includes two vertical standards 16 and 17, such as angles, bolted or otherwise secured to the stationary enclosure 10 on either side of the opening or door 13 therein. Suitable seal means such as resilient seal 9 is provided between the frame and building 10. Connected between the vertical standards 16 and 17 are a horizontal header 18, floor joist 19 and sill 20, such as angles or the like. These horizontal members 18, 19 and 20 may likewise be secured to the stationary enclosure 10. It is preferred that the horizontal members 18 and 19 be located above and below the opening 13 in the stationary enclosure 10. Secured to the vertical standards 16 and 17 are sills 20, 21, 22 and 26 arranged in a rectangular pattern. Extending upwardly from the junctures of sill 26 with sills 21 and 22 are short vertical standards 23 and 24. Supported on the standards 16, 17, 23 and 24 at an outwardly and downwardly sloping angle are floor joist 19, 25, 27 and 28. Each of the members 21, 22, 23, 24, 25, 26, 27, and 28 is an angle or the like.

FIG. 2 illustrates the two side walls 29 and 30 with side wall 29 shown partially by dashed lines. Side wall 29 is connected to standards 16 and 23, sill 21 and joist 27. Side wall 30 is connected to vertical standards 17 and 24, sill 22 and joist 28. The inner edges 29a and 30a, respectively, of side walls 29 and 30 are sealed to the stationary enclosure 10 by gasket 9. The outer edges 29b and 30b, respectively, of side walls 29 and 30 extend outwardly from the stationary enclosure 10 a selected distance.

FIG. 3 is an elevational view of the connecting corridor 12 without the van in contact therewith. A floor 40 is positioned on the slanted joist 27 and 28 of the frame apparatus 15. The floor 40 preferably comprises four channels 41 welded or otherwise connected together to form an open rectangle. Secured to the top of the four channels 41 and supported on interior joists 41a is a sheet of plywood or the like to complete the floor. The inner edge of the floor 40 preferably abuts the stationary enclosure 10 beneath the door or opening 13. A pair of jackscrews 43 (only one of which is shown) is incorporated into the outer edge of the floor 40 adjacent the side edges thereof and operate against joist 25 to raise and lower the outer edge of the floor 40. Thus, the angle of slant of the floor 40 can be adjusted to match the height of various van floors. The floor 40 is slidably sealed between the two parallel side walls 29 and 30 by resilient gaskets (not shown) between the side edges of the floor and the walls. The floor extends outwardly from the stationary enclosure 10 a selected distance to a plane substantially adjacent the outer edges of 29b and 30b, respectively, of the side walls 29 and 30.

Figure 4A:
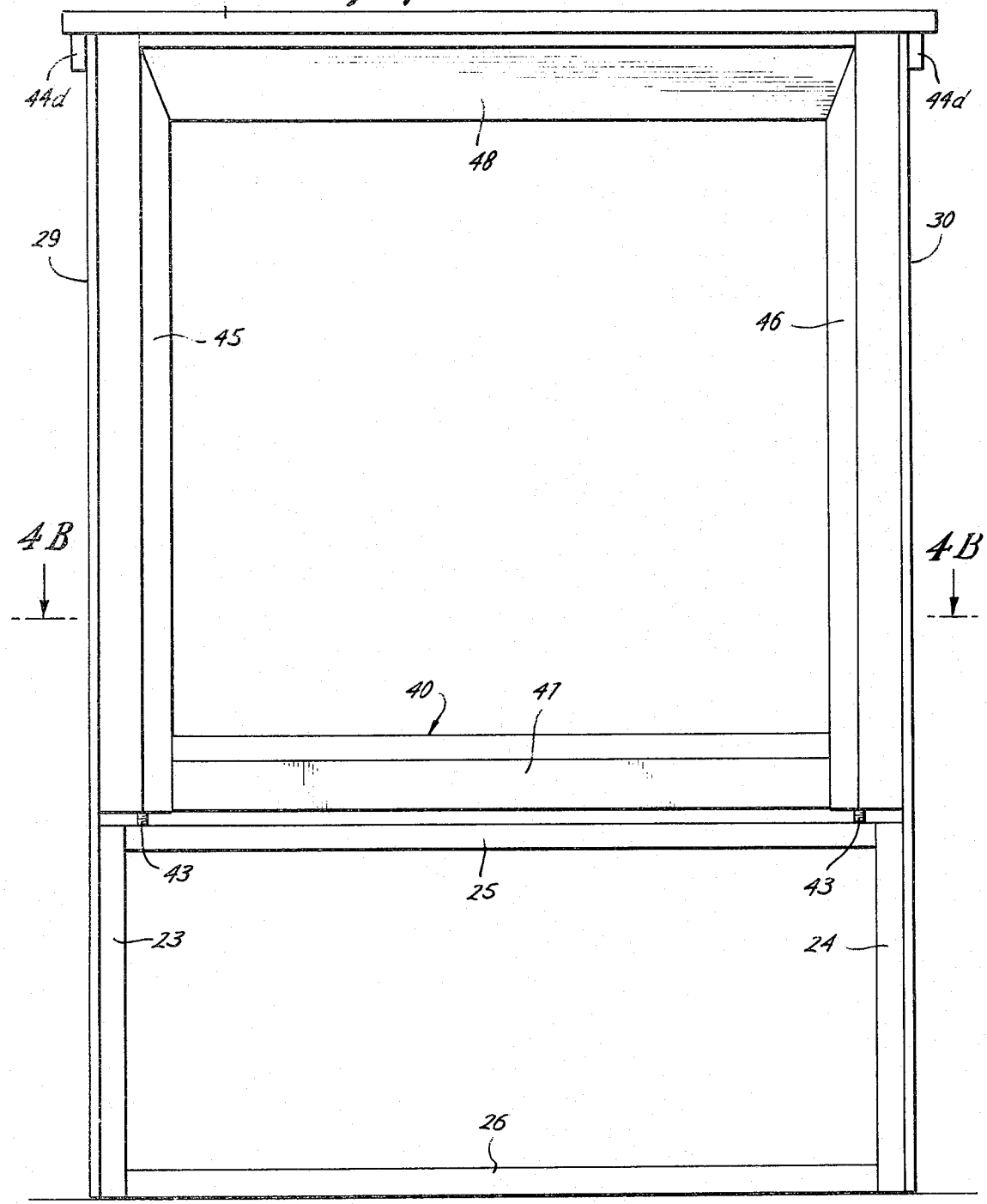
FIG. 4a is an end view of a connecting corridor according to this invention.

A cover structure 44 is positioned on top of the header 18, and the side walls 29 and 30. The cover structure 44 preferably is waterproof and may be constructed in any of numerous manners well known to those skilled in the art. The cover structure 44 illustrated in FIG. 3 is constructed of rafters 33 sandwiched between plywood sheets 33a and 33b. A roof apron 44d extends downwardly from the roof to a point below the top of the side walls to provide a rain and water deflector (FIG. 4a). A suitable roofing material, such as reinforced resin is applied over the sandwich. The inner edge 44a of the cover structure 44 preferably is sealed to the stationary enclosure 10 by flashing 44c. The outer edge 44b of the cover structure 44 preferably extends outwardly from the stationary enclosure 10 a selected distance to a point approximating the plane of the outer edges 29b and 30b of the side walls.

Figure 4B:
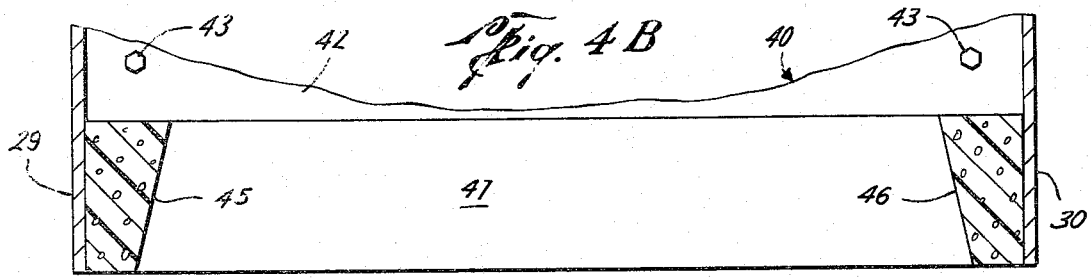

As shown particularly in FIGS. 3, 4a, and 4b, secured to the outer edge of side wall 29 is resilient sealing means 45. Secured to the outer edge of side wall 30 is resilient sealing means 46. Each of these resilient sealing 45 and 46 preferably presents a slanting surface to the inside of the connecting corridor. As shown particularly in FIG. 3, connected to the outer edge of the base platform 40 is a resilient sealing means 47. Resilient sealing means 47 preferably is square in cross sectional area. As shown particularly in FIGS. 3, 4a, and 4b, connected to the underside of the cover structure 44 adjacent its outer edge 44b is resilient sealing means 48. Resilient means 48 preferably presents a slanted surface to the inside of the connecting corridor.

The resilient seal means are preferably provided by a resilient material such as foam rubber covered with sheet plastic to provide a sliding resilient seal.

The combination of the resilient sealing means 45, 46, 47, and 48 presents an open rectangular space for receiving the rear end of a van of varying width and height. The height of the outer edge of the floor 40 is adjusted to the proper level for the door height of the van 11 by screws 43. When the van 11 is maneuvered whereby it contacts the resilient sealing means 45, 46, 47, 48 with its door within the open rectangular space, the connecting corridor 12 according to this invention will provide a weatherproof corridor between the inside of the van 11 and the inside of the stationary enclosure 10. The van is backed into place compressing the sealing means 45, 46, 47, and 48. The inclined surfaces of the seal means accomodates vans of different sizes.

FIGS. 5a, 5b and 5c illustrate the preferable configuration of the resilient sealing means when the connecting corridor 12 is to be utilized with a van 11 of various heights having the door 14 in the side thereof. When the door 14 is in the side of the van 11 it is preferable that the roof and the resilient sealing means 45a, 46a and 48a be configured as shown in FIGS. 5a, 5b and 5c. Each of the resilient sealing means 145 and 146 are secured to the outer edges of the side walls 29 and 30 and preferably are square in cross-section. The resilient sealing means 148 secured to the underside of the roof 144 adjacent its outer edge again presents a slanted surface to the inside of the connecting corridor, but, as shown particularly in FIG. 5b, the roof is longer and the roof and seal extend beyond and overhangs the resilient sealing means 145 and 146. Rather than the cover structure 144 being permanently secured to the side walls, it is releasably attached thereto. Thus, the outer edge 144b of the roof may be raised and lowered by releasing the roof attachments 159 (FIG. 5a). The outer edge 144b may be raised when the van is being maneuvered into position against the sealing means 145, 146, and 147, to prevent damage from auxiliary structures on the van and is lowered once the van is in position whereby the resilient sealing means 148 contacts the top of the van and forms a weatherproof seal. The van when backed into position compresses side wall seal 145, 146 and floor seal 160. The top seal may not be in contact with the van when the roof is reconnected to the side walls. In this case the leveling jacks carried by the van are utilized to elevate the van and compress top seal 148.

From the foregoing, it will be understood that this present invention provides an improved connecting corridor between a stationary enclosure and a movable enclosure. It will now be apparent to those skilled in the art that the foregoing disclosure and description of the invention is illustrative and explanatory thereof, and various changes may be made in the construction of the improved apparatus within the scope of the appending claim without departing from the spirit of the invention.

What is claimed is:

1. A connecting corridor adapted to be connected to a building and to abut a movable vehicle comprising,
   a frame connectable to a building,
   said frame having spaced standards adapted to be connected to a building,
   a pair of short supporting standards arranged with said spaced standards in rectangular fashion,
   floor joist connecting said standards,
   said floor joist extending at an outwardly and downwardly sloping angle from the spaced standards,
   two side walls carried by the standards on opposite sides of the frame,
   a roof over the frame and extending between said side walls,
   means for sealing between said roof and side walls and a building,
   a floor supported on said floor joist,
   jacking means between the floor and floor joists adjacent to said short standards for changing the angle of the floor to match the height of the floor of a vehicle adjacent the corridor, resilient sealing means connected to the free end of the two side walls and the floor and roof, the rectangular opening formed by the resilient sealing means on the two side walls, the floor and roof adapted to encompass the door of a movable vehicle with the wall of the vehicle sealed to the corridor by the resilient sealing means.

2. The corridor of claim 1 wherein the roof extends beyond the two side walls and the floor and is releasably attached to the two side walls so that it may be raised while a van is moved into position engaging the resilient means on the side walls and floor and then lowered and secured in position with the roof sealing means engaging the roof of a van.

3. The corridor of claim 1 wherein the confronting interior surfaces of the sealing means on the side walls and roof diverge in an outwardly direction and are adapted to receive there between the ends of vehicles of differing sizes and seal therewith.

* * * * *